UNITED STATES PATENT OFFICE.

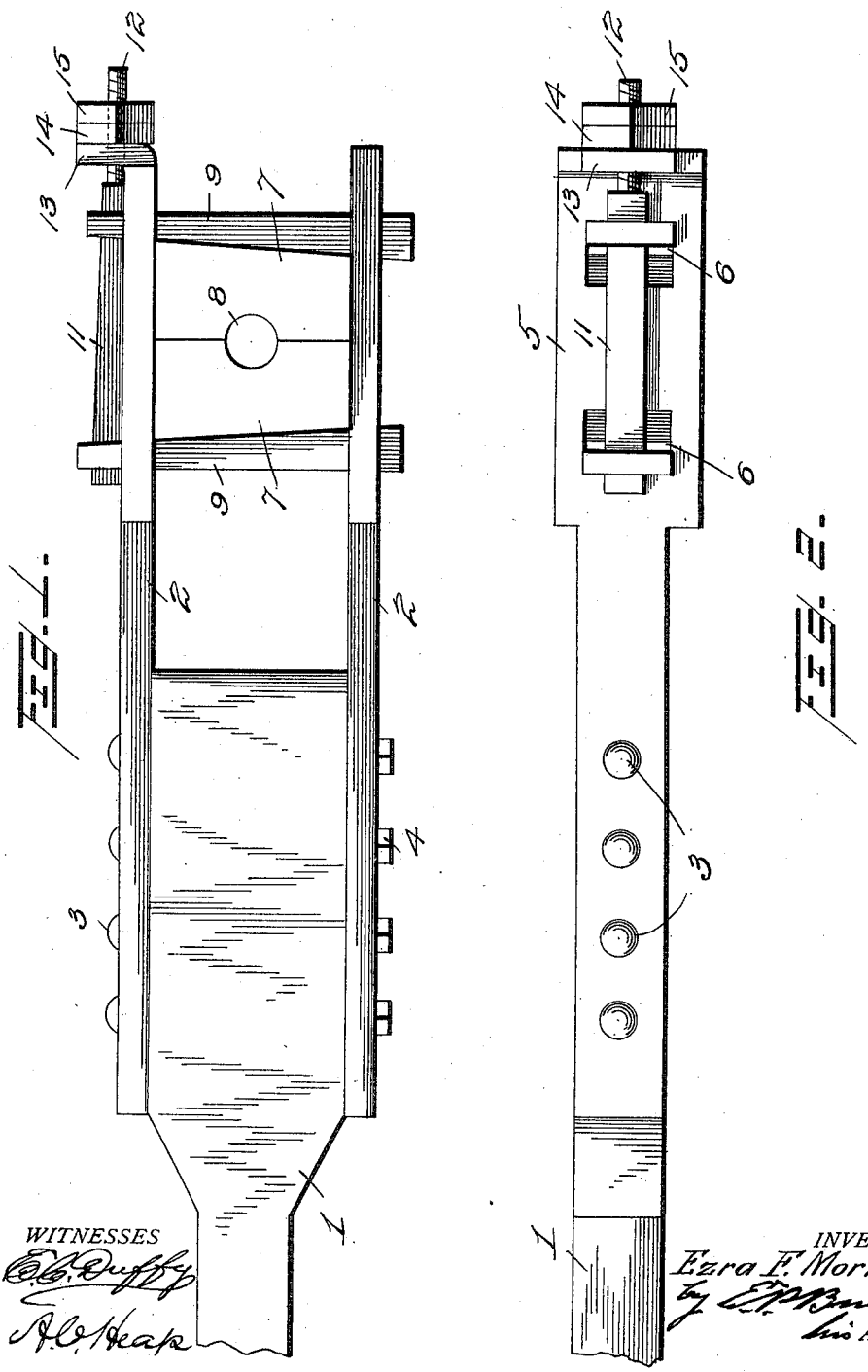

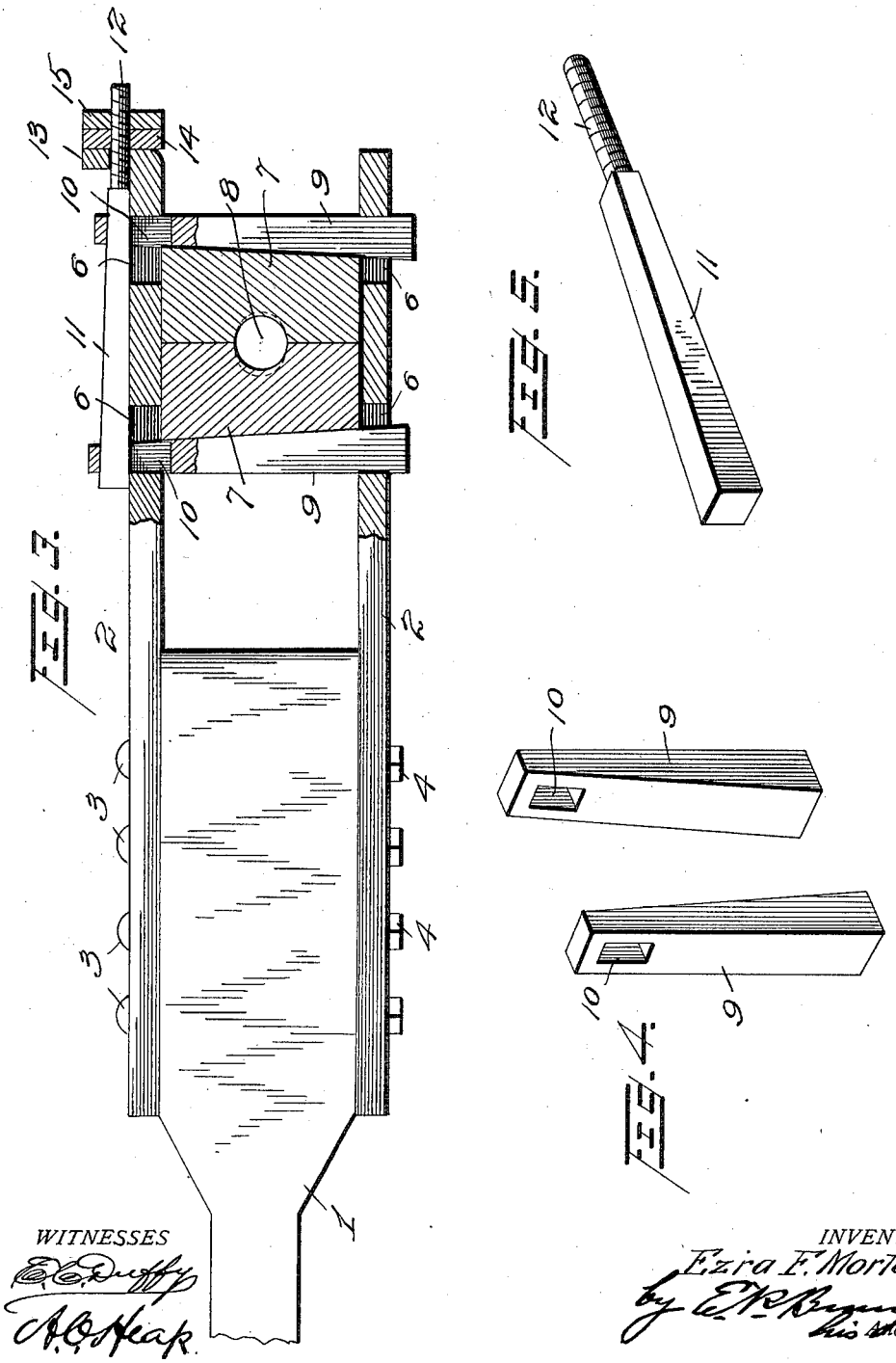

EZRA F. MORTON, OF LONG PINE, NEBRASKA.

ADJUSTABLE WRIST-PIN BEARING.

1,032,620.  Specification of Letters Patent.  Patented July 16, 1912.

Application filed December 29, 1911. Serial No. 668,548.

*To all whom it may concern:*

Be it known that I, EZRA F. MORTON, a citizen of the United States of America, residing at Long Pine, in the county of Brown and State of Nebraska, have invented certain new and useful Improvements in Adjustable Wrist-Pin Bearings, of which the following is a specification.

This invention relates to adjustable wrist pin bearings and one of the principal objects of the invention is to provide means for taking up lost motion of the wrist pin in the bearing carried by the pitman of a hay mower or other machine or implement operated by a pitman.

Another object of the invention is to provide a bearing composed of two blocks of brass or other similar material, each having a semi-circular opening therein for the wrist pin, said blocks being held in position by means of three wedges for clamping the bearing blocks together, said wedges all being operated by a single nut for clamping the blocks.

Still another object of the invention is to provide means for taking up wear on the wrist pin in the bearing blocks to prevent lost motion, by filing away the meeting faces of the blocks and adjusting them by means of the wedges.

It is a well known fact that the constant reciprocations of a pitman will wear the bearing for the wrist pin and in order to take up the wear and to prevent lost motion various means have been resorted to.

My invention comprises a pair of bearing blocks preferably of brass provided with meeting faces and a wrist pin bearing aperture extending through the blocks. After the wrist pin has worn the bearing upon opposite sides of the aperture, the blocks are removed and filed away on their meeting faces, thus making the bearing aperture round and fitting the wrist pin. The two blocks are held in proper position upon the end and connected to the pitman by means of three wedges as will be hereinafter described.

Referring to the drawings:—Figure 1 is a side elevation of a wrist pin bearing made in accordance with my invention and connected to the outer end of the pitman; Fig. 2 is a top plan view of the same; Fig. 3 is a vertical sectional view; Fig. 4 is a detail perspective view of two of the wedges for the sides of the bearing blocks; and Fig. 5 is a detail perspective view of the locking wedge.

Referring to the drawings, the numeral 1 designates a pitman and connected to the opposite edges of the end of the pitman are metal bars 2, said bars being connected to the pitman by means of bolts 3 and nuts 4. The outer ends of the bars 2 are enlarged as at 5 and provided with rectangular openings 6 disposed in alinement as shown more clearly in Fig. 3. The brass bearing blocks 7 may be slightly wedge-shaped, as shown in Figs. 1 and 3 and said blocks are each provided with a semi-circular opening which when the two blocks are placed together form a circular opening 8 for the wrist pin. Two wedges 9 are passed through the openings 6 with one face of each wedge bearing against one of the blocks 7, said wedges each having a rectangular opening 10 at the smaller end thereof. The locking wedge 11 is passed through the openings 10 and said locking wedge is provided with a screw threaded shank 12.

One of the bars 2 is provided with a turned up lug 13 through which the threaded shank 12 extends and fitted to said threaded shank is a nut 14 and a lock nut 15.

The operation of my invention may be briefly described as follows: When the wrist pin wears the opening 8 as shown in dotted lines in Fig. 3, the two brass members 7 are removed from the pitman and filed away on their meeting faces until the aperture 8 is substantially round, after which the blocks are replaced and the wedges adjusted by screwing up the nut 14 on the shank 12. After the adjustment has been made and the blocks 7 are adjusted closely together by the wedges the lock nut 15 is turned on the shank against the nut 14 to hold the members in place.

From the foregoing, it will be obvious that the entire adjustment on four sides of the two block members is made by turning the nut 14 on the shank 12, thus clamping the four sides of the two block members 7 by adjusting one nut. It will also be apparent that by filing away the meeting faces of the two members 7 a substantially round bearing can be provided for the wrist pin which will obviate all lost motion.

My invention is of simple construction, can be manufactured at low cost and is very efficient for its purpose.

I claim:

1. An adjustable wrist pin bearing comprising a pair of blocks, each provided with a semi-circular opening therein, a pitman provided with bars having alined openings therein, wedges extending through said openings on opposite sides of the blocks, said wedges being provided with rectangular apertures, a locking wedge extending through said apertures and provided with a threaded shank, said shank extending through a lug formed on one of the bars connected to the pitman and a nut and lock nut on said shank.

2. A wrist pin bearing block comprising a pitman having apertured bars connected thereto, a bearing block comprising two members, apertured wedges for clamping said members together, said wedges passing through the apertures in the bars, a locking wedge extending through the apertures in said wedges, said locking wedge being provided with a threaded shank, and a nut and lock nut on said threaded shank.

3. An adjustable wrist pin bearing block comprising a pitman, two block members provided with semi-circular openings therein, bars connected to said pitman and provided with alined openings, wedges extending through said openings and bearing against the block members, said wedges being provided with openings, a locking wedge extending through said openings, a nut and lock nut fitted to the locking wedge for moving the same and clamping four sides of the block members.

In testimony whereof I affix my signature in presence of two witnesses.

EZRA F. MORTON.

Witnesses:
MABEL PETERSON,
C. A. ALLEN.

---

Copies of this patent may be obtained for five cents each, by addressing the "Commissioner of Patents, Washington, D. C."